US011238533B2

(12) United States Patent
Peck-Walden et al.

(10) Patent No.: US 11,238,533 B2
(45) Date of Patent: Feb. 1, 2022

(54) OPTIMIZED ELECTRONIC MATCH ENGINE WITH EXTERNAL GENERATION OF MARKET DATA USING A MINIMUM DATA SET

(71) Applicant: Chicago Mercantile Exchange Inc., Chicago, IL (US)

(72) Inventors: Pearce Peck-Walden, Chicago, IL (US); Rosa Frenkel, Buffalo Grove, IL (US); José Antonio Acuña-Rohter, Chicago, IL (US); Pritesh Soni, Naperville, IL (US); Dileep Konduru, Chicago, IL (US); Melissa Jenner, Naperville, IL (US); Frederic Malabre, Middletown, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 758 days.

(21) Appl. No.: 14/830,166

(22) Filed: Aug. 19, 2015

(65) Prior Publication Data

US 2017/0053349 A1    Feb. 23, 2017

(51) Int. Cl.
*G06Q 40/04*     (2012.01)
*G06Q 30/02*     (2012.01)

(52) U.S. Cl.
CPC ......... *G06Q 40/04* (2013.01); *G06Q 30/0201* (2013.01)

(58) Field of Classification Search
CPC .... G06Q 40/04; G06Q 30/0201; G06Q 40/06; G06Q 40/00; G06F 8/10
See application file for complete search history.

(56) References Cited

U.S. PATENT DOCUMENTS

| | | | |
|---|---|---|---|
| 7,831,491 B2 | 11/2010 | Newell et al. | |
| 2008/0243675 A1* | 10/2008 | Parsons | G06Q 40/00 705/37 |
| 2009/0327153 A1* | 12/2009 | Milne | G06Q 40/04 705/36 R |
| 2010/0036705 A1* | 2/2010 | Andrews | H04L 45/00 705/37 |

(Continued)

OTHER PUBLICATIONS

Market Data Request, Onix Solutions, 3 pp., retrieved on Jul. 22, 2015 at http://www.onixs.biz/fix-dictionary/4.3/msgType_V_86.html.

(Continued)

*Primary Examiner* — Matthew S Gart
*Assistant Examiner* — Stephen S Swartz
(74) *Attorney, Agent, or Firm* — Lempia Summerfield Katz LLC

(57) ABSTRACT

Systems and methods are provided for an optimized electronic match engine of an exchange is disclosed that distributes a minimum data set to an external market data generation (MDG) processor. The optimized electronic match engine derives a minimum data set from data already known to the optimized electronic match engine. The MDG processor may extract the minimum data set and uses it to generate market data outside of the optimized electronic match engine. In some examples, an order entry (OE) message transmitted from the optimized electronic match engine may be appended with the minimum data set in a simple binary encoding (SBE) format.

20 Claims, 11 Drawing Sheets

(56) References Cited

U.S. PATENT DOCUMENTS

| | | | |
|---|---|---|---|
| 2010/0174633 A1* | 7/2010 | Milne | G06Q 40/06 705/37 |
| 2010/0268605 A1 | 10/2010 | Waelbroeck et al. | |
| 2011/0087579 A1* | 4/2011 | Milne | G06Q 40/04 705/37 |
| 2012/0010867 A1* | 1/2012 | Eder | G06N 5/022 703/13 |
| 2012/0317011 A1* | 12/2012 | Duquette | G06Q 40/04 705/37 |
| 2013/0218739 A1 | 8/2013 | Kmiec et al. | |
| 2013/0282549 A1* | 10/2013 | Howorka | G06Q 40/04 705/37 |
| 2014/0149273 A1* | 5/2014 | Angell | G06Q 40/04 705/37 |
| 2014/0310146 A1 | 10/2014 | Milne | |
| 2015/0081622 A1 | 3/2015 | Meacham et al. | |

OTHER PUBLICATIONS

New Order—List, Onix Solutions, 5 pp., retrieved on Jul. 22, 2015 at http://www.onixs.biz/fix-dictionary/4.3/msgType_E_69.html.

New Order—Multileg, Onix Solutions, 3 pp., retrieved on Jul. 22, 2015 at http://www.onixs.biz/fix-dictionary/4.3/msgType_AB_6566.html.

New Order—Single, Onix Solutions, 6 pp., retrieved on Jul. 22, 2015 at http://www.onixs.biz/fix-dictionary/4.3/msgType_D_68.html.

New Order List, Onixs, 2 pp., retrieved on Jul. 22, 2015 at http://www.onixs.biz/fix-dictionary/5.0.SP2/msgType_E_69.html.

New Order Single, Onix Solutions, 6 pp., retrieved on Jul. 22, 2015 at http://www.onixs.biz/fix-dictionary/5.0.SP2/msgType_D_68.html.

NASDAQ TotalView-ITCH, Version 5.0, 29 pp., Mar. 6, 2015.

Oct. 2, 2016—(PCT) International Search Report—App. PCT/US16/47785.

FIX.5.OSP2_EP168—Fields sorted by Field Name, © 2007-2012 FIX Protocol Limited, http://www.fixtradingcommunity.org/FIXimate/FIXimate3.0/latestEP/en/FIX.5.OSP2_EP168/fields_sorted_by_name.html, retrieved Oct. 4, 2016, 18 pages.

Extended European Search Report in European Patent Application No. 16837912, dated Mar. 19, 2019, 7 pages.

Examination Report in European Patent Application No. 16 837 912.1, dated Apr. 26, 2021, 6 pages.

* cited by examiner

| Normalized Sample (field delimiter: \|, group start: [, group end: ]) A\|B{C\|D{E}\|F}G\|H | | | | |
|---|---|---|---|---|
| Unique Delimiters | Field Delimiter | Group Start | Group End | Sample | Notes |
| 1 | \| | | | A\|B\|C\|D\|E\|F\|G\|H | In order to locate repeating groups, a receiver will require knowledge of which keys make up these groups. |
| 1 | ‖ | | | A\|B‖C\|D‖E‖\|F\|G‖H | |
| 2 | ‖ | [ | [[ | A\|B‖C\|D[E‖[[F\|G‖[H | These are effectively the same option; all that is changing is which character is used as a multiple and to indicate which delimiter. |
| 2 | ‖ | [ | ] | A\|B‖C\|D[E]‖F\|G‖[H | |
| 2 | ‖ | [ | ] | A\|B‖C\|D[E[F\|G]H | |
| 3 | \| | [ | ] | A\|B\|C\|D[E]\|F\|G]H | |

Figure 3

Normalized Sample (field delimiter: |; groupstart: {; group end: }; group delimiter: *)
A|B|C|{D|{E*F*G}*H}|I|J

| Unique Delimiters | Field Delimiter | Group Start | Group Delimiter | Group End | Sample | Optional Fields | Repeating Group Occurrence Count<br>Req'd = required<br>Rec'd = recommended | Notes |
|---|---|---|---|---|---|---|---|---|
| 1 | \| | { | { | } | A\|B\|C\|{D\|E\|F\|G}\|H\|I\|J | Fields are optional at the end of a message. Optional fields in the middle of a message can be indicated by two consecutive field delimiters or a protocol specific null value indicator. | Req'd | Will need template in order to parse if repeating groups exist in the message. |
| 1 | \| | = | = | = | A\|B\|C\|=D\|E\|F\|G=\|H\|I\|J | Fields are optional at the end of a message. Optional fields in the middle of a message can be indicated by a protocol specific null value indicator. | Rec'd | |
| 2 | \| | { | [ | } | A\|B\|C\|{D\|E\|F\|G}\|H\|I\|J | Fields are optional at the end of a message. Optional fields in the middle of a message can be indicated by two consecutive field delimiters or a protocol specific null value indicator. | Req'd | Will need template in order to parse if repeating groups exist in the message. |
| 2 | \| | [ | [ | ]] | A\|B\|C\|[D\|[E\|F\|G]\|H]\|I\|J | Fields are optional at the end of a message. Optional fields in the middle of a message can be indicated by two consecutive field delimiters or a protocol specific null value indicator. | Rec'd | There are many variations of this. All that changes is which character is used as a multiple and to indicate which delimiter. See the template options table for a similar example. |
| 3 | \| | { | ; | } | A\|B\|C\|{D\|E\|F\|G};H\|I\|J | Fields are optional at the end of a message. Optional fields in the middle of a message can be indicated by two consecutive field delimiters or a protocol specific null value indicator. | Rec'd | |
| 4 | \| | { | ^ | < | A\|B\|C\|{D\|E^F^G}<H\|I\|J | Fields are optional at the end of a message. Optional fields in the middle of a message can be indicated by two consecutive field delimiters or a protocol specific null value indicator. | | |

Figure 4

OPTIMIZED ELECTRONIC MATCH ENGINE WITH EXTERNAL GENERATION OF MARKET DATA USING A MINIMUM DATA SET

RELATED APPLICATIONS

The present application is related to U.S. application Ser. No. 10/982,535, filed Nov. 5, 2004 (and granted into U.S. Pat. No. 7,831,491 on Nov. 9, 2010), which is a continuation-in-part of U.S. application Ser. No. 10/903,826, filed Jul. 30, 2004 and which also claims the benefit of priority to U.S. provisional patent application No. 60/517,491, filed Nov. 5, 2003; the entire disclosures of the aforementioned are herein incorporated by reference in their entireties.

TECHNICAL FIELD

Aspects of the present disclosure relate to using a minimum data set from a match engine to generate market-by-order (MBO) and market-by-price (MBP) price book data. In particular, aspect of the present disclosure relate to a market data generation (MDG) processor external to an optimized electronic match engine of an exchange arranged to generate MBO and MBP data using a minimum set of order metadata transmitted by the optimized electronic match engine.

BACKGROUND

As the number of orders and trades increases, the distribution of messages can strain computer systems and networks that are used to transmit such messages. The processing of numerous messages and associated overhead consumes bandwidth and processing time. For example, current exchanges include an electronic match engine that also generates market data. Thus the electronic match engine is overloaded with processing requirements. These current messaging architectures are inefficient. There is room in the art to improve existing architectures and message types to overcome one or more shortcomings.

SUMMARY

This summary is not intended to identify critical or essential features of the disclosures herein, but instead merely summarizes certain features and variations thereof. Other details and features will also be described in the sections that follow.

In various embodiments, aspects of the present disclosure can be partially or wholly implemented on a computer-readable medium, for example, by storing computer-executable instructions or modules, or by utilizing computer-readable data structures. Of course, the methods and systems disclosed herein may also include other additional elements, steps, computer-executable instructions, or computer-readable data structures.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure may take physical form in certain parts and steps, embodiments of which will be described in detail in the following description and illustrated in the accompanying drawings that form a part hereof, wherein:

FIG. 3 illustrates various delimiters utilized in templates and data messages in accordance with an embodiment of the disclosure;

FIG. 4 illustrates additional delimiters utilized in templates and data messages in accordance with an embodiment of the disclosure;

DETAILED DESCRIPTION

In one example in accordance with aspects of the disclosure, an optimized electronic match engine of an exchange is disclosed that distributes a minimum data set to an external market data generation (MDG) processor. The optimized electronic match engine continues to perform the primary function of order matching, but does not generate market data. Instead, the optimized electronic match engine derives a minimum data set from data already known to the optimized electronic match engine as part of its primary order matching function. The minimum data set may be transmitted to the MDG processor in one of numerous ways. Moreover, the optimized electronic match engine is more technologically efficient because it does not maintain/store in its computer memory the current state of market data book.

At the MDG processor, the data messages received from the optimized electronic match engine may comprise the minimum data set. The MDG processor extracts the minimum data set and uses it to generate market data outside of the optimized electronic match engine. As a result, the load on the optimized electronic match engine may be favorably reduced and the generation of market data may be off-loaded to an external MDG processor.

In numerous examples in accordance with aspects of the disclosure the data messages received and processed by the MDG processor may have been modified to add the minimum data set to its payload. In some examples, an order entry (OE) message transmitted from the optimized electronic match engine may be appended with the minimum data set in a simple binary encoding (SBE) format. In other examples, the message type transformed with the minimum data set by the optimized electronic match engine may be a type other than the OE message type. In other examples, the minimum data set may be inserted into the existing message type or a new message type in fields located near the front, middle, or back of (e.g., appended to) the message.

Illustrative Operating Environment

Figure 1:
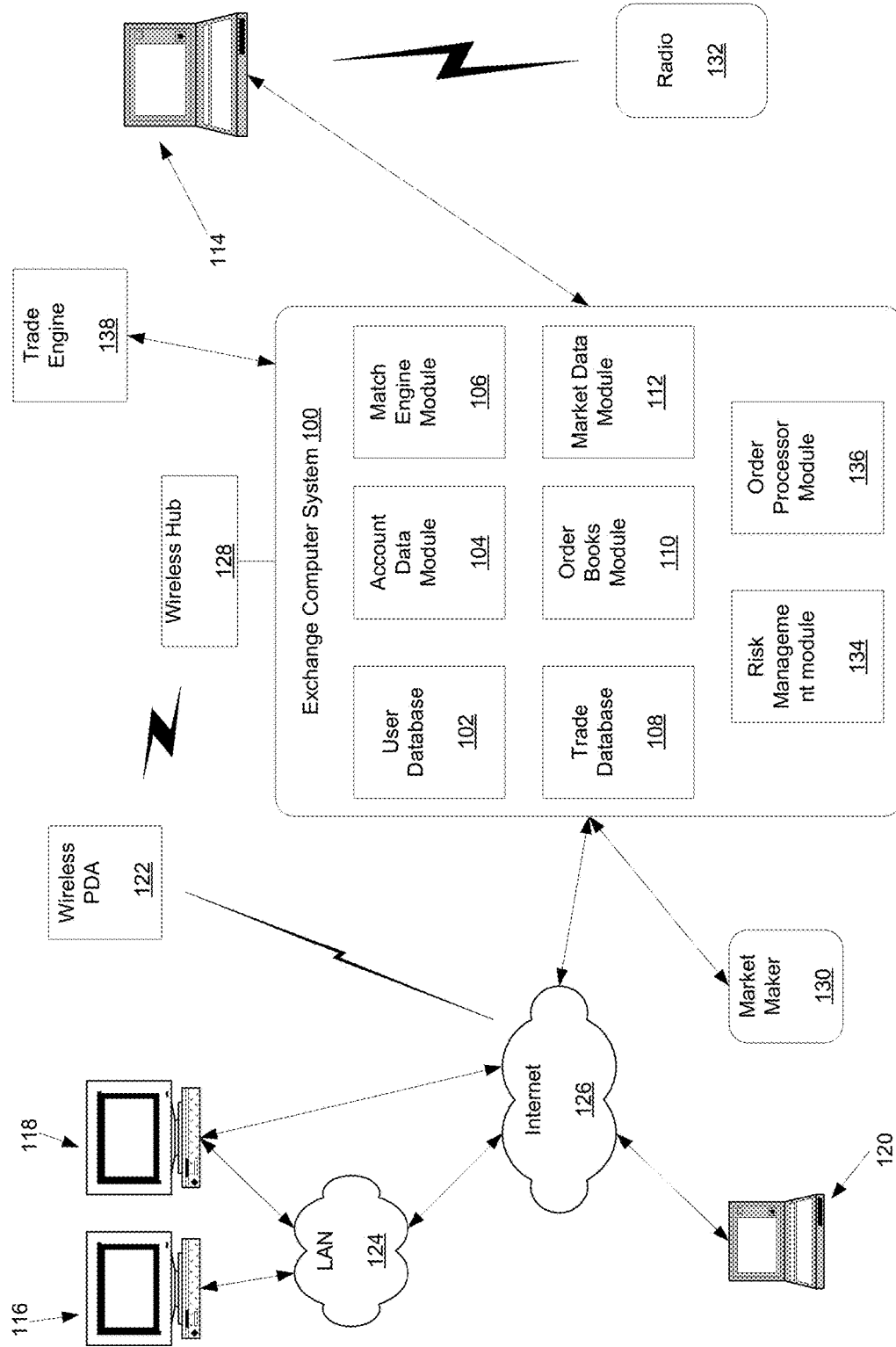
FIG. 1 shows a computer network system that may be used to implement aspects of the present disclosure.

Aspects of the present disclosure are preferably implemented with computer devices and computer networks that allow users to exchange trading information. An illustrative trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a Ti line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
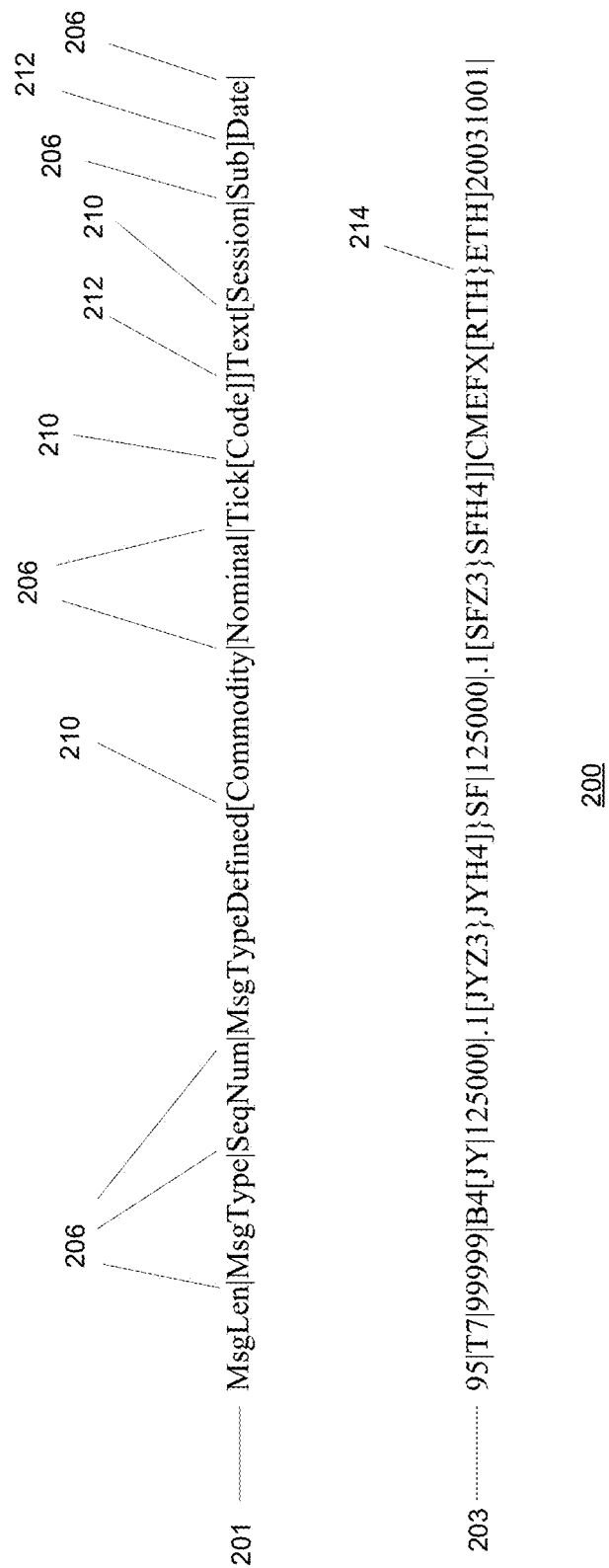
FIG. 2 shows an embodiment of the messaging structure in accordance with an embodiment of the disclosure.

FIG. 2 describes a messaging structure 200 using a market data messaging format for communicating electronic data of any nature within the printable character set of any language is described. Meaning may be associated with actual message content without including any keys in the actual messages or requiring any kind of positional references to data in the messages. This approach supports flat message structures, as well as nested groups of repeatable data to any level of nested depth. A financial data message may comprise a market data message sent from an exchange and/or orders or messages delivered to an exchange.

FIG. 2 illustrates one embodiment of messaging structure 200. In FIG. 2, a template 201 and a message 203 are illustrated. As shown in FIG. 2, the message structure 200 may consist of delimiters to demarcate each attribute so that datum can be easily extracted. Templates such as template 201 may predefine an attribute order so that extracted datum can be associated with meaning. The use of delimiters and templates in messaging structure 200 may enable the messaging structure to be readily extensible.

Character "|" 206 is used to denote a delimiter in an embodiment of the disclosure. Those skilled in the art will realize that many other additional characters may be utilized to represent a delimiter such as characters "[" 210 and "]" 212 and "}" 214. The delimiters may separate data elements within a given message structure. One or more templates such as template 201 may be defined and disseminated to 1) indicate the number and nature of supported message structures (flat or nested groups of repeatable data), as well as 2) the meaning of the data that may be communicated within a given message structure. The delimiters used may or may not be communicated in the templates, as well. One or more message structures corresponding to each template may be defined and disseminated, carrying actual or meaningful content.

FIGS. 3 and 4 illustrate various options for delimiters to be used in messaging structure 200 of the present disclosure. Those skilled in the art will realize that FIGS. 3 and 4 are not an exhaustive list of the various delimiters choices but are only an illustrative list. For example, FIGS. 3 and 4 may contain other options and may map to other options (not shown) using varying multiples of characters to represent the four illustrated delimiters. The use of multiple characters for delimiters may be less efficient but semantically the same as the options illustrated in FIGS. 3 and 4.

FIGS. 3 and 4 include a unique delimiters column 302 which may indicate the number of unique characters used to build delimiters. Some of the various options may use multiple consecutive occurrences of one character to form a delimiter. The choice of delimiter characters may not change the format or the messaging structure 200.

Considerations such as printability and character set may affect the actual characters and encoding chosen. For each alternative presented, a printable character may be chosen to represent each of the delimiters. Each table in both FIGS. 3 and 4 includes a "Field Delimiter" column 304, a "Group Start" column 306, a "Group End" column 308, a "Sample" column 310, and a "Notes" column 312. The "Sample" column 310 may include a normalized sample. The sample may be translated into its form for each alternative presented. In addition, FIG. 4 also includes a "Group Delimiter" column 314, "Options Fields" column 316, and a "Repeating Group Column" 318.

In many of the alternatives listed in FIGS. 3 and 4, the "Group End" 308 characters and the "Group Delimiter" 314 characters are the same. A field outside the repeating group in question specifies the number of occurrences of the group. This may allow a parsing algorithm to take advantage of the predictive nature of these tags because they may not be able to depend on the delimiters themselves to uniquely demarcate message structure. In some cases these fields may be necessary in order to parse the message.

The "Options Fields" 316 shown in FIG. 4 may be attached at the end of data messages. The "Options Fields" 316 may also be found at the end of repeating groups in data messages or at other places in a message and/or repeating groups in data messages.

The delimiters defined in FIGS. 3 and 4 may be used to demarcate attributes and repeating groups. The utilization of four delimiters is deemed optimal such as "Field Delimiter" 304, "Group Start" 306 delimiter, "Group Delimiter" 314, and "Group End" 308 delimiter. The use of four delimiters may be optimal because: 1) counts for the number of times a group repeats may not be needed thus saving bytes and simplifying the parsing algorithm; 2) delimiters at the end of repeating groups may be dropped if no data is present; 3) the parsing algorithm to extract datum may be generic for all messages; and 4) any message may be parsed without reference to message types.

Delimiters and templates may be disseminated or communicated by any means that allow them to be incorporated in an electronic system. The message structures then disseminated may be of variable length with data elements shortened or extended in length, as well as included or not present on a real-time per message basis. Message structures, depending on the choice of implementation, may be parsed without prior knowledge of the message content, without references or keys to the content, and/or without fixed positional reference to the message structures.

One or more templates such as template 201 may be defined and disseminated to 1) indicate the number and nature of supported messages (linear or nested groups), as well as 2) indicate the meaning of the data that may be communicated within a given type of message. Templates may allow datum to be associated with meaning by 1) defining the attributes, and 2) indicating the order in which they will appear. The use of delimiters within a given message type may also be communicated in its template.

Once the templates have been disseminated, messages corresponding to each template may be built and disseminated, carrying actual content. The messages may be of variable length with data elements shortened or extended in length, as well as included or not present on a real-time basis. Templates, and thus messages, may be changed on-the-fly so that attributes can be added, deleted, and/or re-order as needed. Template and message integrity may be checked per instance of receipt by validating message size.

In one embodiment of the disclosure, the messaging format detailed assumes the following: 1) messages are being passed from a sender to one or more receivers; 2) the method of dissemination is variable; 3) two fundamental types of messages are sent, templates and data messages; 4) the data being sent can be represented in key=value pairs; 5) templates define the order of data in data messages; 6) templates contain keys and data messages contain associated values; and 7) a protocol that uses this formatting scheme will provide needed functionality as necessary (such as including a mechanism by which to match a data message with a template or including a mechanism to verify message contents).

A message may consist, conceptually, of fields and repeating groups. Repeating groups may be nested and also consist of fields and repeating groups. In templates, a repeating group may only exist once. In messages, a repeating group may occur multiple times. All these occurrences may be consecutive.

As discussed above, messages may consist, structurally, of fields and delimiters. Every field may be followed by one or more delimiters. Field delimiters may separate fields within a group or in the message. If the last element of a message is not a repeating group, it may be followed by a "Field Delimiter" 304; otherwise it may be followed by the "Group End" 308 delimiter. "Group Start" 306 delimiters may mark the beginning of a group definition in a template and a repeating group in a data message. "Group Delimiters" 314 do not exist in templates and separate occurrences of a repeating group in data messages. "Group End" 308 delimiters may mark the end of a repeating group and may be placed after the last element of the last occurrence of a repeating group. Every "Group Start" 306 delimiter may be matched by a "Group End" 308 delimiter later in the message.

Message structure 200 may perform several functions such as: 1) order attributes which convey data; 2) it provides a means for extracting specific datum from the overall message; and/or 3) provide a method for associating the datum with meaning. Optimizing a message structure, therefore, involves ordering attributes in an efficient manner while allowing datum to be extracted and associated with meaning in a likewise efficient manner. An optimized message structure, moreover, may readily allow attributes to be added, deleted or re-ordered, as well as efficiently handle attributes which either may not be present or vary in length on a per message basis.

A fully optimized message structure may communicate only meaningful content in a format that expresses the data in the smallest possible size. A structure for stating price, for example, may only state the price without overhead. The format for stating the price, moreover, might be optimized by expressing it as a binary rather than string statement.

Message structure 200 orders attributes in a very efficient manner. Message Structure 200 may use delimiters to demarcate each attribute so datum can be readily extracted. Message structure 200 may use templates to pre-define attribute ordering so extracted datum can be associated with meaning.

Message structure 200 may carry data within the printable character set of any language. Message structure 200 supports linear strings of data, as well as nested groups of repeatable data to any level of nested depth. Ordering of attributes may be determined by at least four factors: 1) attributes which are potentially repeatable to optimize efficiency are placed in repeating groups; 2) repeating groups are nested so that common data resides in the outer most group(s) and unique data resides in the inner most group(s); 3) data common to the entire message resides outside any repeating group; 4) attributes which may not appear often are placed at the end of a repeating group or at the end of the message. The last factor may allow delimiters for those attributes without values in a given instance to be dropped.

Template and message integrity may be checked per instance of receipt by validating message size. Messages may be further validated against the structure of its corresponding template.

The advantages of the delimited structure may include: 1) efficient message structure that produces message sizes comparable to or better than an optimized fixed length structure; 2) retains the flexibility of key-value and mockup structures for adding, re-ordering and extending the length of data elements contained in messages; 3) supports linear data strings, as well as nested groups of repeatable data to any level of nested depth. It excels at communicating data via complex nested groups which optimize message size efficiency; 4) attributes can be added, deleted, and/or re-order on-the-fly by defining and disseminating a template and then sending messages corresponding to the given template; 5) attributes can be shortened or extended in length, as well as included or not present on a real-time per message basis; 6) messages can be parsed without prior knowledge of the message type, as well as without references or keys to the content; 7) any number of templates and/or message types can be defined, and any nature of data within the printable character set of any language can be communicated; and 8) it is easier to optimize both up-front and over time than a fixed length structure.

A further advantage of the delimited structure may include a variable length message structure that consumes no more bytes than: 1) for linear data strings, the number of bytes used for actual data plus one byte per delimiter in a given message; or 2) for nested message structures, the same number of bytes as above plus potentially X number of bytes to close each nested group of data.

Weaknesses of fixed length message structures include the use of padding to accommodate attributes which either may not be present or vary in length on a per message basis. Each attribute must be padded to a fixed length equal to the longest possible value the attribute might convey. This is needed to maintain a consistent overall fixed length structure (or consistent fixed length partitions for repeating groups) so that datum can be extracted using a pre-defined set of positional references. The fixed length structure, therefore, also suffers from not being readily extensible.

Thus, a fixed length structure would optimally state instrument, price and quantity as:
 ESZ31075005
and no structure could better optimize the message. It is improbable, however, that a fixed length structure can be as optimized as in the example given above. Because the attributes vary in length on a per message basis, they will have to be padded:
 ESZ3-----0010750000005.
Thus, the fixed length message size is inflated by a total of 11 unneeded characters in this instance.

If the delimited structure described above is used instead:
 ESZ3|107500|5|
 ESV3C1060|1040|5|
This structure incurs an overhead of 3 control characters for delimiters and improves upon the fixed length example where padding is added.

From the perspective of optimizing message size, however, the delimited structure may be ultimately deemed equal to the use of an optimized fix length structure when the structures do not include repeating groups of data. The constraints may include: 1) the more attributes with values that will vary in length as well as the more attributes that will not be present in every instance, the more efficient the delimited structure will be; and 2) the more attributes with values of constant length and always present the more efficient the fixed length structure will be.

The following examples compare messages which communicate date and time, trading system, trading mode, instrument, price, quantity, price variation, order type, and origin:
 20031015153015999GOESZ3-----00107500000005+L4
pads with 11 characters
 20031015153015999|G|O|ESZ3|107500|5|+|L|4|  incurs 9 delimiters When linear strings are thus compared, the two approaches are generally equal with respect to message size. The delimited structure, however, will perform better than the fixed length structure when repeating groups are introduced. Also, the fixed length structure must always be optimized—attributes efficiently ordered and padding kept to a minimum—if it is to perform well.

Figure 5:
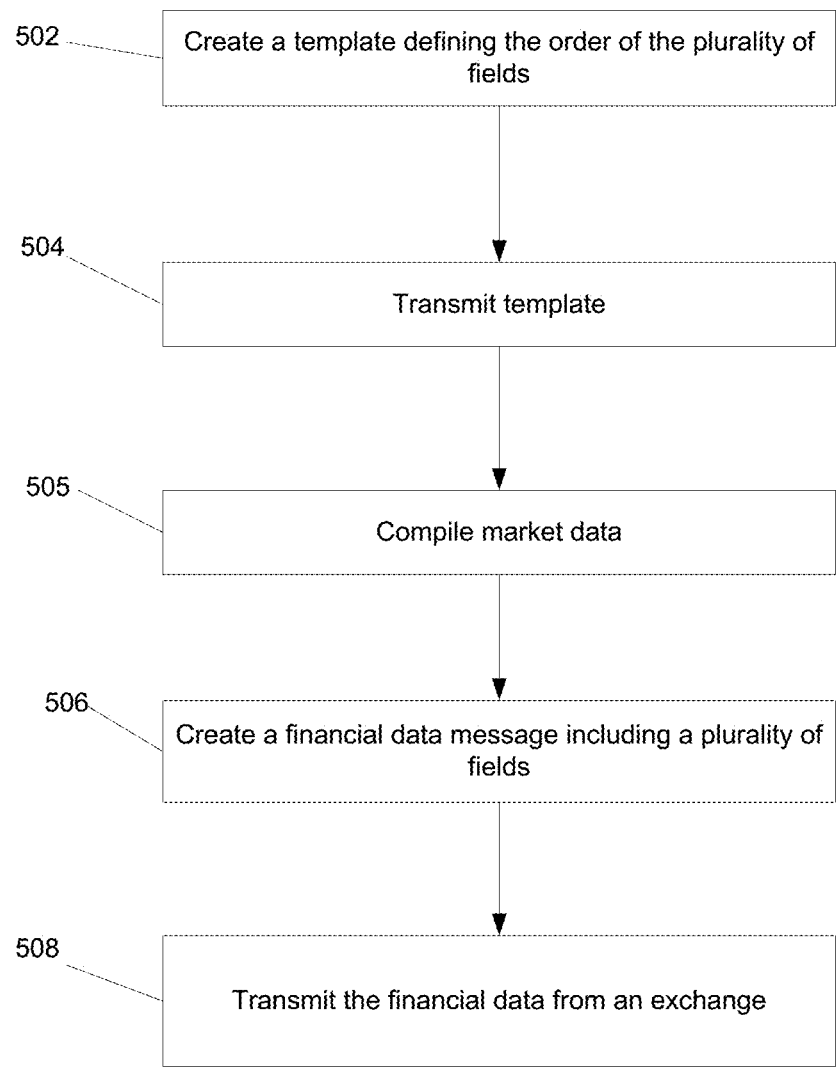
FIG. 5 illustrates a computer implemented method of a creating messaging structure in accordance with an embodiment of the disclosure.

FIG. 5 illustrates a computer a messaging structure in accordance with an embodiment of the disclosure. First, in step 502 a template is created that defines the order of the plurality of fields. Next, in step 504 the template may be transmitted though a network as illustrated in FIG. 1. The market data to be transmitted may be compiled in step 505. The market data may include a plurality of financial information such as orders, quotes or mass quotes, trades, and statistics. The financial information may include derivate products. Derivative products may include options on futures contracts, futures contracts, future contracts that are functions of or related to other futures contracts, or other financial instruments that have their price related to or derived from an underlying product.

A financial data message may be created in step 506. The financial data message may comprise a market data message sent from an exchange and/or orders or messages delivered to an exchange. The financial data message includes a plurality of fields that have been separated by delimiters. The delimiters may include at least one delimiter that is used to identify a repeated group of information. Finally, in step 508 the financial data message may be transmitted from an exchange or similar system. The transmission may be across one or more computer, audio, video or data networks.

Figure 6:
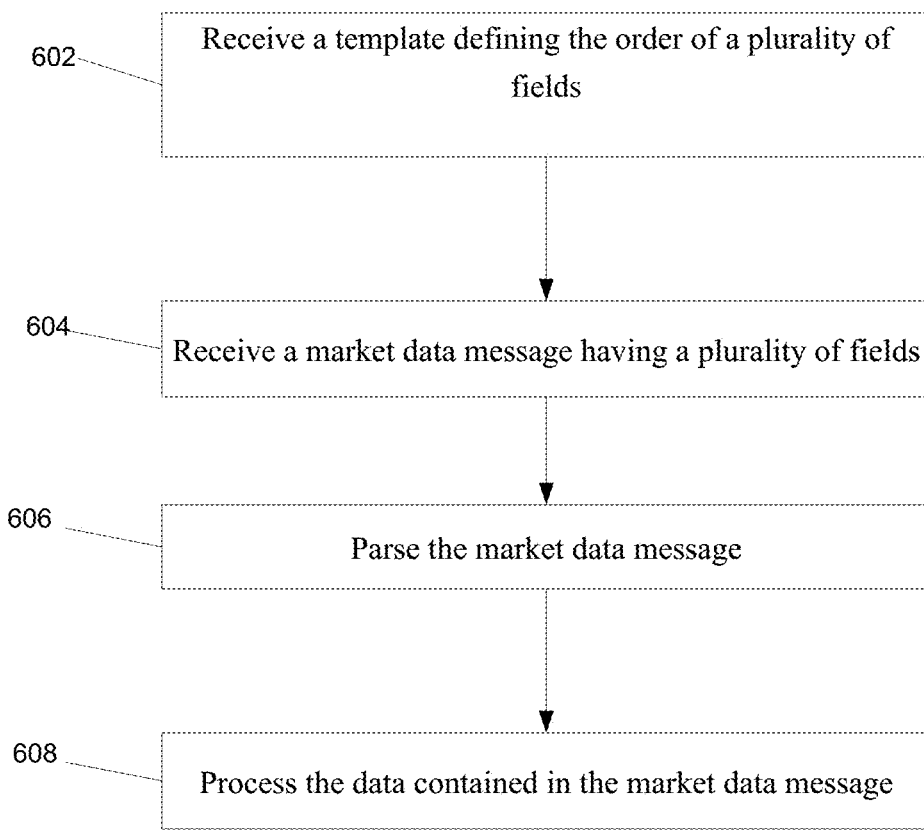
FIG. 6 illustrates a computer implemented method of processing market data in accordance with an embodiment of the disclosure.
Figure 7:
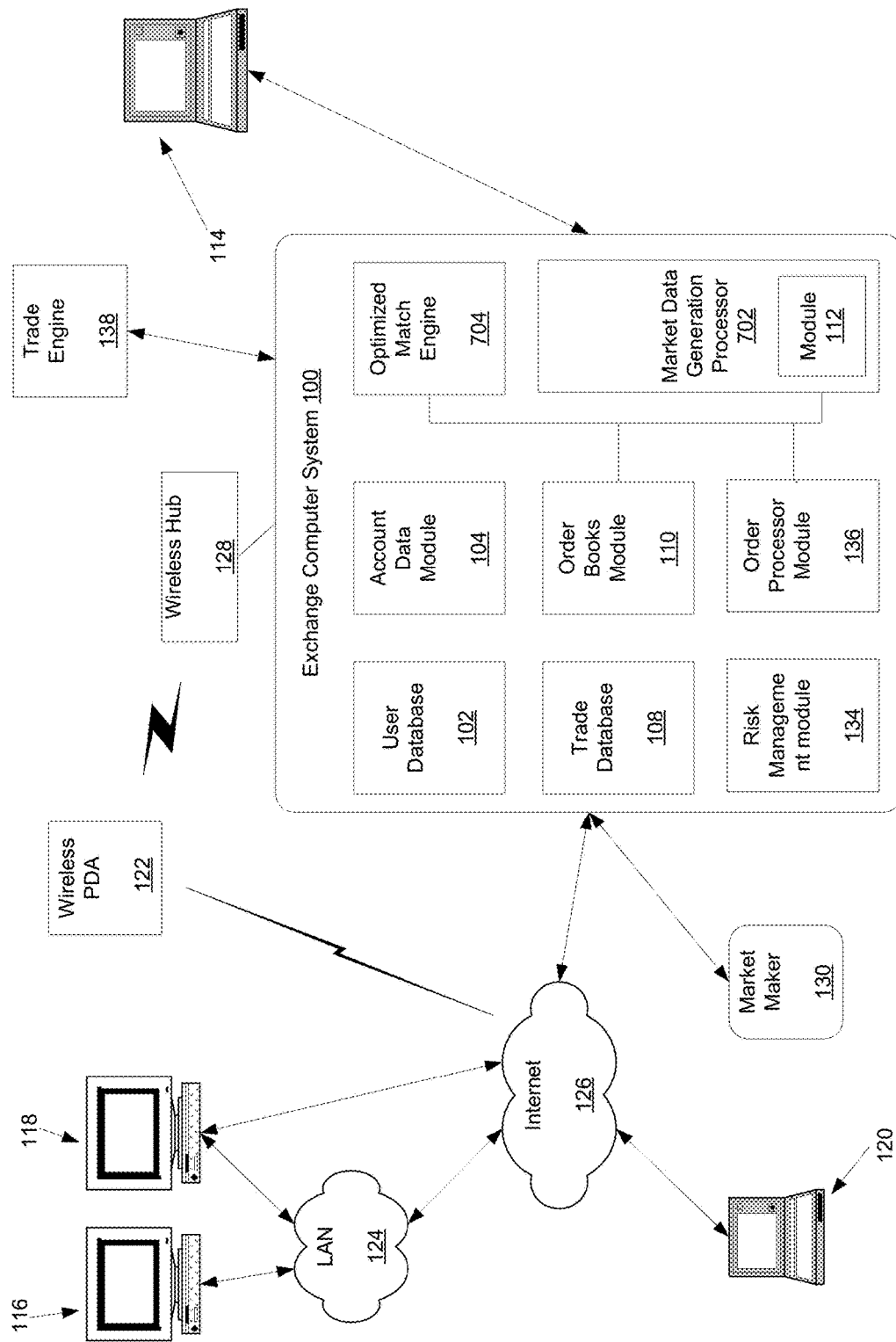
FIG. 7 illustrates a network diagram showing an optimized match engine and market data generation (MDG) processor in accordance with various aspects of the disclosure.

FIG. 6 illustrates a computer implemented method of processing a market data message having a plurality of fields separated by delimiters in accordance with an aspect of the disclosure. In step 602, a template may be received. The template may define the order of the plurality of fields of the market data message. Next, in step 604 a market data message may also be received. The market data message may include a plurality of fields separated by delimiters. The source of the market data message may be the same as the source of the template. In step 606, the market data message may be parsed to extract the fields separated by the delimiters. The data extracted from the market data message may include market data containing a plurality of orders for financial instruments. Finally, in step 608 the data in the market data message may be interpreted based information such as order information included in the template.

Various embodiments described herein utilize market data. In alternative embodiments individual orders and quotes may use the same/similar message structure. The messaging structure 200 of the present disclosure may be used in the processing of market data. The market data may contain a plurality of orders for financial instruments. The financial instruments may be derivative products. Derivative products may include options on futures contracts, futures contracts that are functions of or related to other futures contracts, or other financial instruments that have their price related to or derived from an underlying product. These market data may be received at an exchange that receives and executes orders.

Optimized Electronic Match Engine with External Generation of Market Data Using a Minimum Data Set In accordance with various aspects of the disclosure, an electronic match engine of an exchange may be optimized to reduce the load attributed to generation of market data. The optimized electronic match engine continues to primarily function as an order matching component of the exchange. However, the exchange may offload the function of market data generation to a market data generation (MDG) processor external to the optimized electronic match engine. As a result, the memory consumption requirements of the optimized electronic match engine may be reduced as compared to a non-optimized electronic match engine in numerous examples. Moreover, the processor load caused by the optimized electronic match engine may also be reduced as compared to a non-optimized electronic match engine in numerous examples.

The optimized electronic match engine may operate to publish optimized message content with a minimum amount of data, sometimes referred to as order metadata, to generate market data. The minimum amount of data may, in numerous embodiments, be used to produce market by order (MBO) and/or market by price (MBP) books and statistics feeds to users (e.g., trading customers, quote vendors, or others).

The data elements in the message comprising the order metadata may be derived from order attributes known by the electronic match engine as they are used by the engine for order matching. Messages with order metadata may be used to relate different types of order and match events including, but not limited to: order acknowledgments, rejects, cancels, modifies, eliminations, implied orders; restatements of working order books for start of the week and mid-week recovery events; fills, implied fills, spread match events with leg and implied fills; mass quote acknowledgments, rejects, cancels, modifies and fills; and mass cancels. As such, the message may cover all order/quote/fill related events of the match engine. In some embodiments, the message comprising the order metadata may support event-based market data messages generated outside of the electronic match engine by providing an end of event (EOE) field/flag in each group of data sets representing events by flagging the last order metadata set for a given event where many orders may have participated.

The message can be sent as augment to the order entry (OE) feed or as a separate feed into to the market data generation (MDG) processor to generate market data to customers. Details follow herein describing illustrative examples of the message type and the logic that may permit the MDG processor to convert to market by order (MBO) and/or market by price (MBP) feeds.

In one example in accordance with various aspects of the disclosure, an illustrative order metadata message type may comprise the following fields, data types, and formatting:

TABLE 1

| Tag Name | FIX Tag Number | Enumeration | Data Type | Description | Required |
|---|---|---|---|---|---|
| EndOfEventIndicator | 20005 | 1 = last message in the event<br>0 = not last message | BOOLEAN | End of Event Indicator in CME internal binary messages | Y |
| TransactTime | 60 | | INT | Time of order message acknowledgement that caused the event. Can be viewed as a start of engine event processing time, sent as number of nanoseconds since Unix Epoch (UTC) | Y |
| NoMDEntries | 268 | | NUM_IN_GROUP | Number of data blocks listed in the message | Y |
| >BookQty | 20002 | | INT | Represents Booked Order Qty or Qty visible on Market Data book.<br>For Partial and Full Fill - populated as Book Qty remaining (on Market Data book) | Y |

TABLE 1-continued

| Tag Name | FIX Tag Number | Enumeration | Data Type | Description | Required |
|---|---|---|---|---|---|
| >OrderStatus | 20000 | j: Business Reject, R: Restatement, 4: Cancel, H: Fill Cancel, C: Elimination, 0: New Ack, 1: Partial Fill, 2: Full Fill, G: Fill Modify, 9: Cancel Modify Reject, 5: Cancel Replace, 8: Order Reject | CHAR | after Fill. For Modifies - new order Book Qty after modification. Status or an action that was taken on the order or order fill | Y |
| >OrderPriority | 20001 | | INT | Order priority number assigned by the engine that can be used to determine order book priority against other orders for the same price level. The Lower OrderPriority number = Higher Order Book Priority = Lower Order Book Level | Y |
| >OrderID | 37 | | INT | Unique identifier for order as assigned by the venue. Uniqueness is guaranteed within a trading week across all instruments. | Y |
| >SecurityID | 48 | | INT | Security ID as defined by the trading venue. | Y |
| >Price | 44 | | FLOAT | Price per share or contract | Y |
| >Side | 54 | 2: Sell, 1: Buy | CHAR | Side of order. | Y |
| >LastPx | 31 | | FLOAT | Price of this (last) fill. For leg fills this indicates the leg fill price. | C |
| >LastQty | 32 | | INT | Quantity of shares bought/sold on this (last) fill. For leg fills this indicates the leg fill quantity. | C |
| >TradeID | 1003 | | INT | The unique identifier for the trade entry, per instrument + trading date | C |
| >NumOrdersInMatchStep | 9700 | | INT | Number of real orders in the fill on both buy and sell sides of the match. Must be a consistent number across all message entries for the same TradeID and Instrument in a given Event. Populated with 0 (zero) when no real orders participated in the match step for the instrument (implied only fills or leg fills). | C |
| >AggressorFlag | 20003 | 0: Not aggressor, 1: Aggressor | INT | Indicates if message entry represents an aggressor for the fill or if there is no aggressor | C |

The EndOfEventIndicator, TransactTime, and NoMDEntries fields may be fields that are used for purposes of managing the number of data blocks listed in the message when the message is spread across multiple message packets. In such examples, the EndofEventIndicator field may contain a value of "0" or "1" to designate that the message that caused the start of the optimized electronic match engine has concluded. These three aforementioned fields may be header-level fields. Moreover, one or more of the unique identifier fields (e.g., SecurityID, TradeID, and OrderID) may be combined and/or collated/conflated into a single unique identifier field. As such, the number of fields of the minimum data set may be just ten fields in some embodiments, but twelve fields in other. Meanwhile, including the header-level fields in the count, the number of fields in the minimum data set may be as much as fifteen. Fields may, in some examples, be separated by one or more predefined delimiters.

Meanwhile, the other fields in Table 1 above, represent the minimum data set used by the market data generation (MDG) processor to generate market data. Those field include: BookQty, OrderStatus, OrderPriority, OrderID, SecurityID, Price, Side, LastPx, LastQty, TradeID, NumOrdersInMatchStep, and AggressorFlag. Descriptions of these fields and their formatting are illustrated in Table 1 above. While the minimum data set identified in Table 1 is the closed set of data a MDG processor needs (e.g., order metadata) to generate market data of both MBO and MBP type, a person having ordinary skill in the art will appreciate after review of the entirety disclosed herein that one or more fields may be combined/conflated into a common field, or the aforementioned fields may be separated/span across multiple fields. Such deviations from the minimum data set disclosed in Table 1 are contemplated by the disclosure.

In an example in accordance with aspects of the disclosure, an illustrative minimum data set transmitted to a market data generation (MDG) processor 702 is illustrated in Table 2. That example illustrates the result of an operation at an exchange of an outright match event in which an incoming ask aggressor order trades with two resting bid orders. Before the outright match is performed, the state of the exchange may be such that the instrument being traded is represented as follows: <Instrument> group is in <Open>, <Instrument> Electronic Trade Volume=0. Meanwhile, the relevant excerpt of the order book in market data component memory reads as follows:

| BID OrderID | Quantity | Price | ASK OrderID | Quantity | Price |
|---|---|---|---|---|---|
| 7010393582 | 3 | 1006 | 1 | | |
| 7010393583 | 5 | 1004 | 2 | | |
| 7010393543 | 8 | 1002 | 3 | | |
| 7010393542 | 10 | 1002 | 4 | | |
| | | | 5 | | |

And the market-by-price order book in the memory of the market data generation (MDG) processor 702 reads as follows:

| BID NumOfOrders | Quantity | Price | ASK NumOfOrders | Quantity | Price |
|---|---|---|---|---|---|
| 1 | 3 | 1006 | 1 | | |
| 1 | 5 | 1004 | 2 | | |
| 2 | 18 | 1002 | 3 | | |
| | | | 4 | | |
| | | | 5 | | |

With that context, when the following event occurs: incoming Ask Order Qty=5 fully fills Bid at Px=1006 and Partially Fills Bid at Px=1004, then the optimized match engine 704 may generate the following minimum data set, as illustrated in Table 2:

TABLE 2

| Description | End of event | Order priority | Status | BookQty | SecurityID | OrderID | BookPx | Side | FillPx | FillQty | TradeID | Num Of Orders | Agressor Flag |
|---|---|---|---|---|---|---|---|---|---|---|---|---|---|
| Ask Ack | 0 | 123987 | 0 | 5 | 85044 | 7010393584 | 1004 | 2 | null | null | null | null | null |
| Ask Partial Fill | 0 | 123987 | 1 | 2 | 85044 | 7010393584 | 1004 | 2 | 1006 | 3 | 1 | 2 | 1 |
| Bid Full Fill | 0 | 198237 | 2 | 0 | 85044 | 7010393582 | 1006 | 1 | 1006 | 3 | 1 | 2 | 0 |
| Ask Full Fill | 0 | 123987 | 2 | 0 | 85044 | 7010393584 | 1004 | 2 | 1004 | 2 | 2 | 2 | 1 |
| Bid PartialFill | 1 | 293847 | 1 | 3 | 85044 | 7010393583 | 1004 | 1 | 1004 | 2 | 2 | 2 | 0 |

In addition to the repeating group-level data of the minimum data set identified in Table 2, header-level data, such as transaction time (e.g., a value of 20140304210448155123000), EndofEvent (e.g., a "1" to designate end of event), and/or NoMDEntries, may be included in the minimum data set.

With the event completed, the final order book processed by the MDG processor may read:

| BID OrderID | Quantity | Price | ASK OrderID | Quantity | Price |
|---|---|---|---|---|---|
| 7010393583 | 3 | 1004 | 1 | | |
| 7010393543 | 8 | 1002 | 2 | | |
| 7010393542 | 10 | 1002 | 3 | | |
| | | | 4 | | |
| | | | 5 | | |

And the final market-by-price book may read:

| BID NumOfOrders | Quantity | Price | ASK NumOfOrders | Quantity | Price |
|---|---|---|---|---|---|
| 1 | 3 | 1004 | 2 | | |
| 2 | 18 | 1002 | 3 | | |
| | | | 4 | | |
| | | | 5 | | |

In addition to updating the order price book, the MDG processor 702 may generate market data messages. In one example, the three market data messages generated may be formatted in FIX format, as illustrated below:

35=X 60=<TransactTime> 5799=00000001 268=2
279=0 269=2 48=85044 83=199 270=1006 271=3 346=2 5797=2
279=0 269=2 48=85044 83=200 270=1004 271=2
35=X 60=<TransactTime> 5799=00000010 268=1
279=0 269=e 48=85044 83=201 271=5
35=X 60=<TransactTime> 5799=10000100 268=2
279=2 269=0 48=85044 83=202 270=1006 271=3 346=1 1023=1
279=1 269=0 48=85044 83=203 270=1004 271=3 346=1 1023=1

In another example in accordance with aspects of the disclosure, an illustrative minimum data set transmitted to a market data generation (MDG) processor 702 is illustrated in Table 3. That example illustrates the result of an operation at an exchange of an implied match event in which a buy EJU4-EJZ4 aggressor is accepted with Qty 2 at 0.5. Assume EJ Group is in the open state and ImpliedMatchingStatus is set to ON. Also assume volumes of instruments EJ:BF M4-U4-Z4, EJM4, EJU4, EJZ4, EJU4-EJZ4 are zero, and the following orders are on the market data book: Buy EJ:BF M4-U4-Z4 Qty 1 @ −1; and Buy EJ:BF M4-U4-Z4 Qty 1 @ −0.5; and Ask EJM4 Qty 2 @ 9980.5; and Buy EJU4 Qty 2 @ 9981.

With that context, when the implied match event occurs in which a buy EJU4-EJZ4 aggressor is accepted with Qty 2 at 0.5, then the optimized match engine 704 may generate the following minimum data set, as illustrated in Table 3:

TABLE 3

| Description | Order priority | Status | Book Qty | Security ID | OrderID | Book Px | Side | FillPx | Fill Qty | TradeID | Num Of Orders | Agressor Flag |
|---|---|---|---|---|---|---|---|---|---|---|---|---|
| Ack EJU4-EJZ4 | 10293810 | 0 | 2 | 110305 | 992109235 | 0.5 | 1 | null | null | null | null | null |
| Full Fill EJ:BF M4-U4-Z4 | 30495820984 | 2 | 0 | 154704 | 992109232 | −0.5 | 1 | −0.5 | 1 | 9 | 1 | null |
| Full Fill EJM4 | null | 2 | Null | 103836 | 992109232 | null | 1 | 9980.5 | 1 | 9 | 1 | null |
| Full Fill EJU4 | null | 2 | Null | 104182 | 992109232 | null | 2 | 9981 | 1 | 17 | 1 | null |
| Full Fill EJU4 | null | 2 | Null | 104182 | 992109232 | null | 2 | 9981 | 1 | 18 | 1 | null |
| Full Fill EJZ4 | null | 2 | Null | 135888 | 992109232 | null | 1 | 9981 | 1 | 9 | 1 | null |
| Partial Fill EJM4 | 1293471927 | 1 | 1 | 103836 | 992109233 | 9980.5 | 2 | 9980.5 | 1 | 9 | 1 | null |
| Partial Fill EJU4 | 20394820 | 1 | 1 | 104182 | 992109234 | 9981 | 1 | 9981 | 1 | 17 | 1 | null |
| Partial Fill EJU4-EJZ4 | 884932847 | 1 | 1 | 110305 | 992109235 | 0.5 | 1 | 0 | 1 | 1 | 1 | 1 |
| Partial Fill EJU4 | Null | 1 | Null | 104182 | 992109235 | null | 1 | 9981 | 1 | 18 | 1 | null |
| Partial Fill EJZ4 | Null | 1 | Null | 135888 | 992109235 | null | 2 | 9981 | 1 | 9 | 1 | null |
| Full Fill EJ:BF M4-U4-Z4 | 29834 | 2 | 0 | 154704 | 992109231 | −1 | 1 | −1 | 1 | 10 | 1 | null |
| Full Fill EJM4 | Null | 2 | Null | 103836 | 992109231 | null | 1 | 9980.5 | 1 | 10 | 1 | null |
| Full Fill EJU4 | Null | 2 | Null | 104182 | 992109231 | null | 2 | 9981 | 1 | 19 | 1 | Null |

TABLE 3-continued

| Description | Order priority | Status | Book Qty | Security ID | OrderID | Book Px | Side | FillPx | Fill Qty | TradeID | Num Of Orders | Agressor Flag |
|---|---|---|---|---|---|---|---|---|---|---|---|---|
| Full Fill EJU4 | Null | 2 | Null | 104182 | 992109231 | null | 2 | 9981 | 1 | 20 | 1 | Null |
| Full Fill EJZ4 | Null | 2 | Null | 135888 | 992109231 | null | 1 | 9980.5 | 1 | 10 | 1 | null |
| Full Fill EJM4 | 2938719 | 2 | 0 | 103836 | 992109233 | 9980.5 | 2 | 9980.5 | 1 | 10 | 1 | null |
| Full Fill EJU4 | 3458739 | 2 | 0 | 104182 | 992109234 | 9981 | 1 | 9981 | 1 | 19 | 1 | null |
| Full Fill EJU4-EJZ4 | 687594 | 2 | 0 | 110305 | 992109235 | 0.5 | 1 | 0.5 | 1 | 2 | 1 | 1 |
| Full Fill EJU4 | Null | 2 | Null | 104182 | 992109235 | null | 1 | 9981 | 1 | 20 | 1 | null |
| Full Fill EJZ4 | Null | 2 | Null | 135888 | 992109235 | null | 2 | 9980.5 | 1 | 10 | 1 | null |

In addition to the repeating group-level data of the minimum data set identified in Table 3, header-level data, such as transaction time (e.g., a value of 20140304210448155123000), EndofEvent (e.g., a "1" to designate end of event), and/or NoMDEntries, may be included in the minimum data set.

With the event completed, the MDG processor 702 may generate market data messages. In one example, the MDG processor 702 may generate a market data trade message formatted in FIX format, as illustrated below:
35=X  60=20140304210448155123000  5799=00000001 268=6
279=0 269=2 48=154704 83=28 270=-0.5 271=1 346=1 5797=0 (EJ: BF M4-U4-Z4)
279=0 269=2 48=103836 83=59 270=9980.5 271=2 346=1 5797=0 (EJM4)
279=0 269=2 48=104182 83=15 270=9981 271=2 346=1 5797=0 (EJU4)
279=0 269=2 48=110305 83=37 270=0 271=1 346=1 5797=1 (EJU4-EJZ4)
279=0 269=2 48=154704 83=27 270=-1 271=1 346=1 5797=0 (EJ: BF M4-U4-Z4)
279=0 269=2 48=110305 83=37 270=0.5 271=1 346=1 5797=1 (EJU4-EJZ4)

In addition, the MDG processor 702 may generate a market data messages, such as an electronic volume message and market data book message, formatted in FIX format, as illustrated below:
35=X  60=20140304210448155123000  5799=00000010 268=5
279=0 269=e 48=154704 83=29 271=2 (EJ: BF M4-U4-Z4)
279=0 269=e 48=103836 83=60 271=2 (EJM4)
279=0 269=e 48=104182 83=16 271=4 (EJU4)
279=0 269=e 48=110305 83=38 271=2 (EJU4-EJZ4)
279=0 269=e 48=135888 83=41 271=2 (EJZ4)
35=X  60=20140304210448155123000  5799=00000100 268=4
279=2 269=0 48=154704 83=30 270=-0.5 271=1 346=1 1023=1 (EJ: BF M4-U4-Z4)
279=2 269=1 48=103836 83=61 270=9980.5 271=2 346=1 1023=1 (EJM4)
279=2 269=0 48=104182 83=17 270=9981 271=2 346=1 1023=1 (EJU4)
279=2 269=0 48=154704 83=31 270=-1 271=1 346=1 1023=1 (EJ: BF M4-U4-Z4)

In another example in accordance with aspects of the disclosure, an illustrative minimum data set transmitted to a market data generation (MDG) processor 702 is illustrated in Table 4. That example illustrates the result of an operation at an exchange of an order book population through a restatement. At the start of the trading week, for example, there may be working orders from the previous week that have not yet been communicated by the match engine 704 to market data consumers. The order book stored in memory of the market data generation (MDG) processor for SecurityID=812101 may be empty due to start of the week. Consequently, the match engine 704 may be scheduled to resend all working orders for market data consumers and illustrative field <SecurityID>=812101 may have four working "good till" orders from the previous week.

With that context, when the restatement occurs, then the optimized match engine 704 may generate the following minimum data set, as illustrated in Table 4:

TABLE 4

| Description | Order priority | Status | BookQty | SecurityID | OrderID | BookPx | Side | FillPx | FillQty | TradeID | Num Of Orders | Agressor Flag |
|---|---|---|---|---|---|---|---|---|---|---|---|---|
| Restatement of a single | 1239877 | R | 5 | 812101 | 549868 | 1004.00 | 2 | null | null | null | null | null |

TABLE 4-continued

| Description | Order priority | Status | BookQty | SecurityID | OrderID | BookPx | Side | FillPx | FillQty | TradeID | Num Of Orders | Agressor Flag |
|---|---|---|---|---|---|---|---|---|---|---|---|---|
| Ask order Restatement of a single Ask order | 1239834 | R | 1 | 812101 | 549862 | 1003.00 | 2 | null | null | null | null | null |
| Restatement of a single Bid order | 95839877 | R | 1 | 812101 | 3549868 | 1002.00 | 1 | null | null | null | null | null |
| Restatement of a single Ask order | 39834 | R | 2 | 812101 | 540020 | 1004.00 | 2 | null | null | null | null | null |

In addition to the repeating group-level data of the minimum data set identified in Table 4, header-level data, such as transaction time (e.g., a value of 20150225174315952971577), EndofEvent (e.g., a "1" to designate end of event), and/or NoMDEntries (e.g., with a value of "4"), may be included in the minimum data set.

With the event completed, the MDG processor 702 may generate market data messages. In one example, the MDG processor 702 may generate a market data book update message formatted in FIX format, as illustrated below:

35=X 60=20150225174315952971577 5799=10000100 268=3
279=0 269=0 48=812101 83=1 270=1002.00 271=1 346=1 1023=1
279=0 269=1 48=812101 83=1 270=1003.00 271=1 346=1 1023=1
279=0 269=1 48=812101 83=1 270=1004.00 271=7 346=1 10232

With the minimum data set received by the MDG processor 702 and applied against the order book stored the memory of the MDG processor 702, the order book may be updated to read as follows:

| BID OrderID | Quantity | Price | ASK OrderID | Quantity | Price |
|---|---|---|---|---|---|
| 3549868 | 1 | 1004.00 | 1 549862 | 1 | 1003.00 |
| | | | 2 540020 | 2 | 1004.00 |
| | | | 3 549868 | 5 | 1004.00 |
| | | | 4 | | |
| | | | 5 | | |

And the market-by-price book at the MDG processor 702 may be updated as follows:

| BID NumOfOrders | Quantity | Price | ASK NumOfOrders | Quantity | Price |
|---|---|---|---|---|---|
| 1 | 1 | 1004 | 2 1 | 1 | 1003.00 |
| | | | 3 2 | 7 | 1004.00 |
| | | | 4 | | |
| | | | 5 | | |

Figure 8:
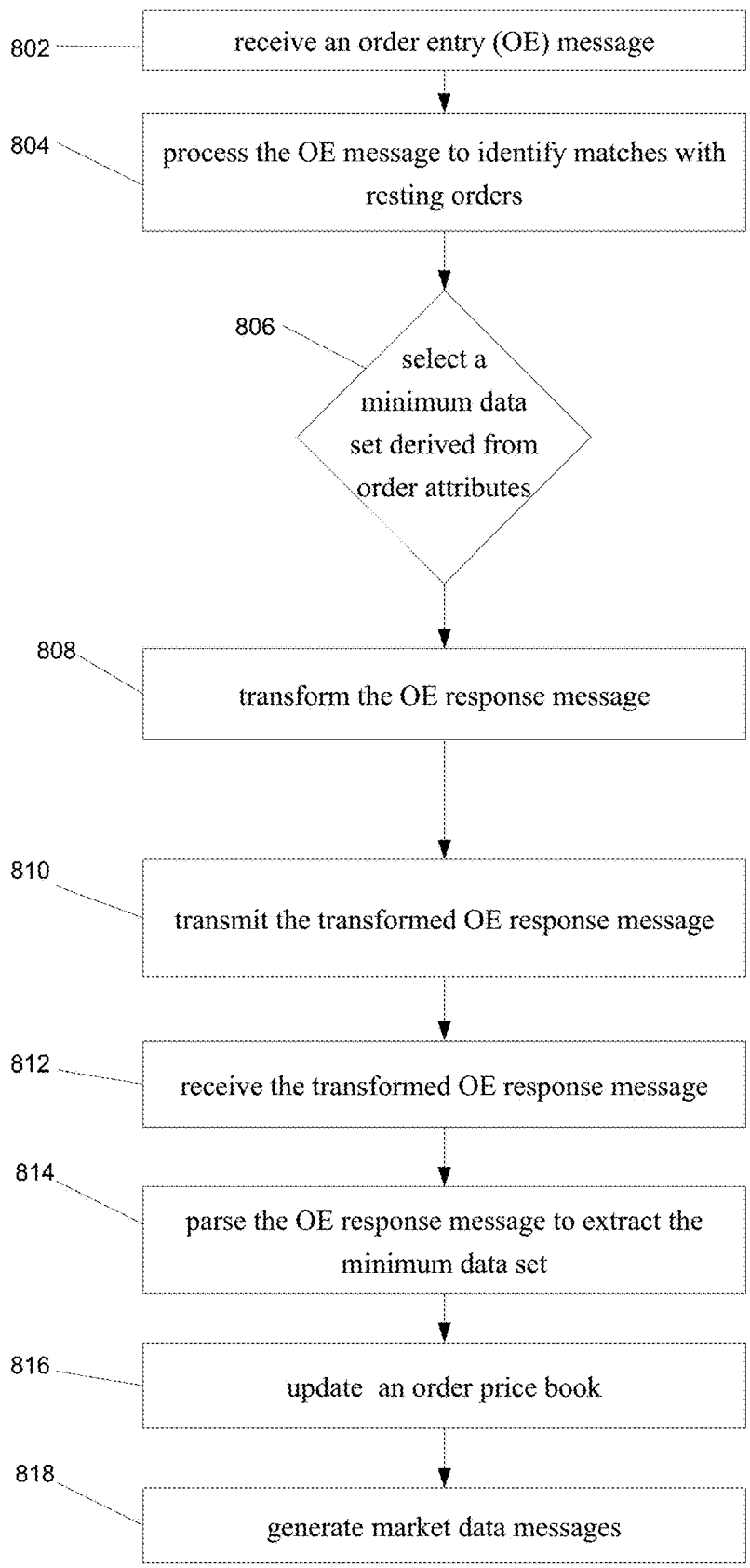
FIG. 8 is a flowchart embodying various steps that may be performed using one or more of a an optimized match engine and market data generation (MDG) processor in accordance with various aspects of the disclosure.

FIG. 8 is a flowchart illustrating some steps that may be performed by a market data generation (MDG) processor 702 in accordance with various aspects of the disclosure. The MDG processor 702 may receive message packets from an optimized match engine 704, wherein the outgoing message packets were transformed by the optimized match engine 704 to insert a minimum data set. For example, the optimized match engine 704 may modify an existing order entry (OE) response message to append the minimum data set to the OE response message's payload. The inserted minimum data set may be formatted in simple binary encoding (SBE) or other encoding.

In one illustrative example, an exchange computer system may receive (in step 802) an OE message in a first data format. In step 804, the optimized match engine 704 may process the OE message to, inter alia, identify matches with one or more resting orders at the exchange (e.g., a match engine event). In some examples, a one-to-many relationship exists between the incoming message (e.g., OE message) and the outgoing message (e.g., OE response message) such that a new incoming message may result in more than one outgoing messages being generated.

Although an OE message type is used for purposes of this example, the disclosure is not so limited. Other existing message types, or new message types, may be used to communicate the minimum data set from the optimized match engine 704 to the MDG processor 702. For example, the minimum data set may be communicated in the clearing interface feed (or trade registration system feed) outbound from the optimized match engine 704, or in other portions of the outbound order entry interface feed. In some examples, the minimum data set might not be piggybacked into an existing message type, but instead communicated in its own new message type. As explained above, the message structure may be optimized to communicate only meaningful content in a format that expresses the data in the smallest possible size. A structure for stating price, for example, may only state the price without overhead. The format for stating the price, moreover, might be optimized by expressing it as a binary rather than string statement. Message structure 1100 may order attributes in an efficient manner. Message structure 1100 may use delimiters to demarcate each attribute so datum can be readily extracted. Message structure 1100 may use templates to pre-define attribute ordering so extracted datum can be associated with meaning. In some examples, the datum of the attributes may be encoded in binary (e.g., SBE).

In step 806, the match engine 704 may select a minimum data set derived from order attributes at the match engine (e.g., order attributes stored in the memory of the match engine 704 for all orders that participated in the match engine event). The minimum data set may correspond to a minimum number of data type fields required to fully represent market data. In one example, the minimum data set may consist of a book order quantity field, order status field, order priority field, order ID field, security ID field, book price field, side of order field, fill price field, last fill quantity field, trade ID field, number of orders in match field, and aggressor flag field. In another example, the minimum data set may consists of a book order quantity field, order status field, order priority field, order ID field, security ID field, book price field, side of order field, fill price field, last fill quantity field, trade ID field, number of orders in match field, and aggressor flag field, and also header-level fields of transaction time field, end of event indicator field, and number of entries field, as illustrated in Table 1.

The minimum data set may be independent of the layout and protocol of the OE messages received by the match engine 704. For example, the match engine 704 may pass along a certain set of data to the market data generation (MDG) processor 702 without converting the OE data to a different message format. The data elements sent by the match engine 704 may be derived from order attributes provided by a module, such as an order entry module. To determine the minimum data set, a message type (e.g., OE message type) is examined to determine how every field in the message format (e.g., FIX format) is populated. Based on how the message is populated, the optimized match engine 704 determines the minimum data set fields needed to satisfy market data message outputs. The message format passed from the match engine 704 to the MDG processor 702 may be used to derive all types of order and match events including, but not limited to: order acknowledgments, rejects, cancels, modifies, eliminations, implied orders; restatements of working order books for start of the week and mid-week recovery events; fills, implied fills, spread match events with leg and implied fills; mass quote acknowledgments, rejects, cancels, modifies and fills; mass cancels; and/or other message types.

Alternatively, every message type that the match engine 705 is configured to receive may be examined and the super-set of all fields that are determined to be essential can be included in the minimum data set. As such, this super-set minimum data set covers all possible incoming message types into the match engine 704. In yet another alternative embodiment, the match engine 704 may maintain a mapping in computer memory at the match engine 704 that dynamically identifies the desired fields of a specific minimum data set for a particular type of incoming message type. As a result, the match engine 704 may send the minimum data set, using an appropriate communication technique as described herein, to the MDG processor 702.

Continuing with the preceding example, in step 808, the match engine 704 may transform an order entry (OE) response message by inserting the minimum data set into the OE message. In those examples where the optimized match engine 704 transforms the OE message type into a modified OE message 1100, the initial message type may already include some of the fields of the minimum data set. For example, the "Price" field may already exist in the OE message type. As such, that field might not be duplicated in the modified portion 1102 of the OE message 1100. At least one benefit of such an arrangement is that the size of the initial packet may be conserved and duplicative fields avoided, thus saving on bandwidth and increasing technological efficiency of the overall system of communication. As a result, while the transformed message 1100 comprises all of the minimum data set identified in Table 1, each of the fields of the minimum data set might not necessarily be located in the modified portion 1102 of the message 1100. Rather, the MDG processor comprises logic to access, extract, and read the modified portion 1102 of the message payload; and where fields of the minimum data set are not present in that payload 1104, the MDG processor will identify the corresponding field in the remaining portion 206 of the incoming message. In some examples, the minimum data set field 1102 may be empty if all of the fields (as listed in Table 1) of the minimum data set are already present in the original message type.

Moreover, the minimum data set need not necessarily be inserted at the end of the existing message packet. Rather, the minimum data set 1102 may be inserted/spliced into the start, middle, or otherwise location of the existing message structure 1100. In some examples, the minimum data set 1102 may occupy an empty (e.g., reserved for later use) field in the existing message structure. In some examples, the minimum data set field may be encoded in binary format (e.g., SBE).

In step 810, the match engine 704 may send the transformed OE message, in one example, over an exchange network. As a result, a market data generation (MDG) processor 702 communicatively coupled to the exchange network, but positioned outside of the match engine 704, may receive, in step 812, the transformed OE message. In other examples, the minimum data set may be transferred to the MDG processor 702 by way of a new, dedicated message type that consists of a payload with only the minimum data set and only essential message header-level information.

In step 814, when the minimum data set is incorporated into an existing message type, the MDG processor 702 may parse the incoming transformed message (e.g., an OE message) to extract the desired minimum data set. The MDG processor 702 may use one or more techniques disclosed herein using templates, delimiters, and/or other items to assist in parsing/extracting/accessing the minimum data set. The values 1104 read from the transformed message may be mapped to their appropriate, corresponding fields.

Figure 10:
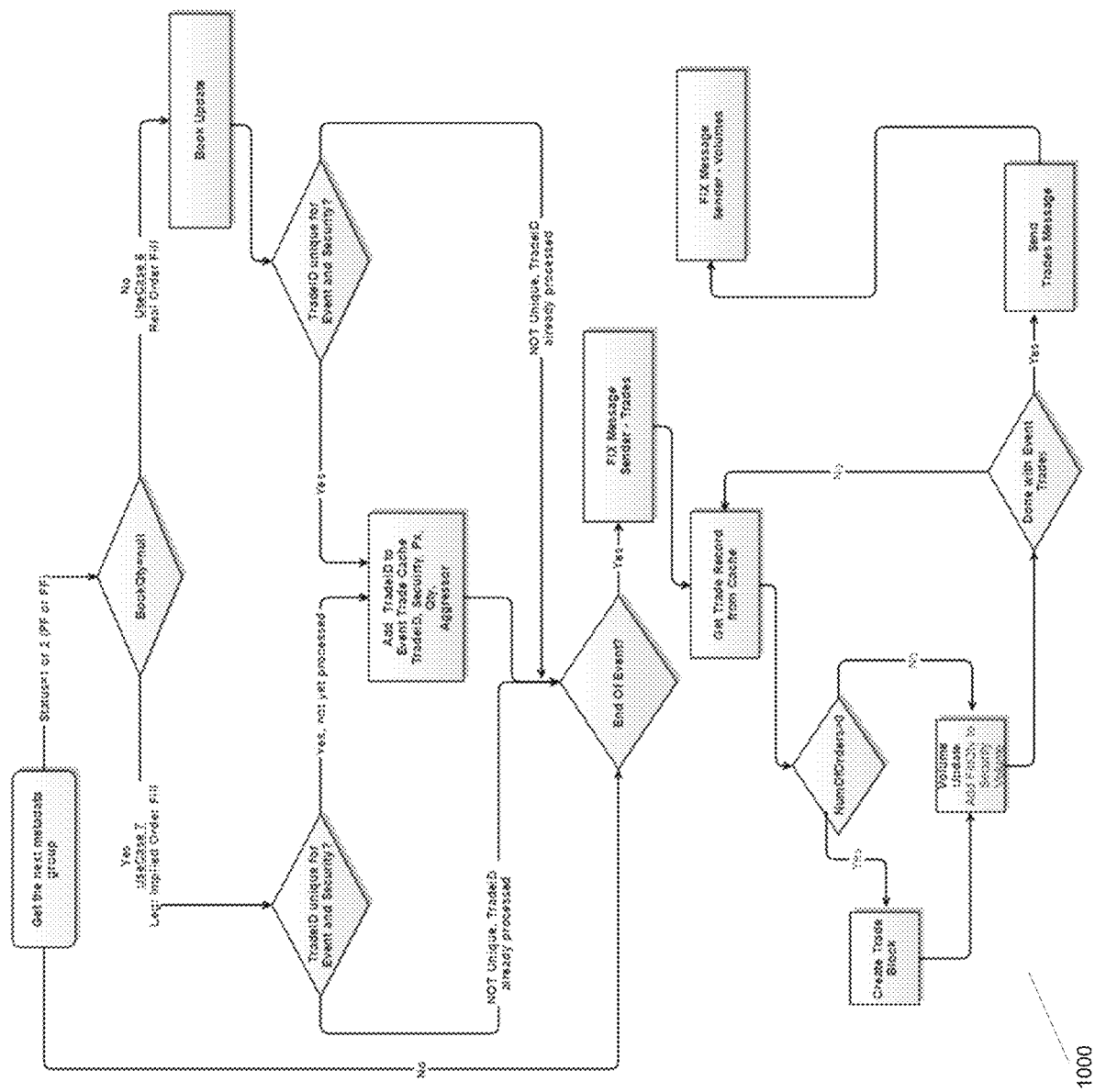

In step 816, the MDG processor 702 may update an order price book stored in a tangible computer memory (e.g., RAM, non-volatile memory, etc.) at the MDG processor 702. The values 1104 previously mapped to their appropriate fields, e.g., such as those fields listed in Table 1, may be used to update the order price book (or other data structure stored in memory accessible to the MDG processor) such that the MDG processor 702 may calculate market data and related statistics for the financial instrument associated with the incoming message. For example, the order book may be arranged to permit the MDG processor 702 to generate market-by-order (MBO) market data messages. In another example, the order book may be arranged to permit the MDG processor 702 to generate market-by-price (MPB) market data messages, or other types of market data messages. Moreover, the MDG processor may calculate and generate (as illustrated in FIG. 10) relevant statistics (e.g., volume) for the exchange.

At least one advantage of the arrangement in the preceding illustrative example is that the optimized match engine 704 need not necessarily maintain the state of the order price book in memory of the optimized match engine 704. As a result, the optimized match engine 704 operates with less memory consumption, more efficiently, and/or with less latency, thus resulting in a technological advancement. Instead, the MDG processor 702 may maintain the state of the order price book in its memory. In addition, in some examples, the exchange computer system may include modules to provide the MDG processor 702 with state information of an order price book in case the MDG processor 702 desires to reconstruct its order price book. Such an instance may arise if, for example, the MDG processor 702 temporarily loses connectivity or wishes to join mid-session and needs to update its order price book.

In step 818, the MDG processor 702 uses the extracted minimum data set to generate market data messages for consumption by participants of the exchange. In some examples, the generated market data messages may be formatted in the well-known FIX format. In other examples, the market data message may be formatted in a different format. The market data messages may correspond to a plurality of orders for financial instruments, mass quotes, and/or may be selected from the group consisting of securities, fixed income, interest rates, agricultural, and/or industrial commodities. In addition, the market data messages may comprise statistics, such as trading volume, and other statistics.

In the preceding example illustrated using FIG. 8, the data elements in the message comprising the order metadata may be derived from order attributes known by the optimized electronic match engine 704 as they are used by the engine for order matching. In some examples, this order metadata may serve as the minimum data set that is packaged and inserted into existing message packets for transmission from the optimized match engine 704 to a market data generation (MDG) processor 702. Order metadata may be derived from all types of order and match events including, but not limited to: order acknowledgments, rejects, cancels, modifies, eliminations, implied orders; restatements of working order books for start of the week and mid-week recovery events; fills, implied fills, spread match events with leg and implied fills; mass quote acknowledgments, rejects, cancels, modifies and fills; mass cancels; and/or other message types.

Figure 9:
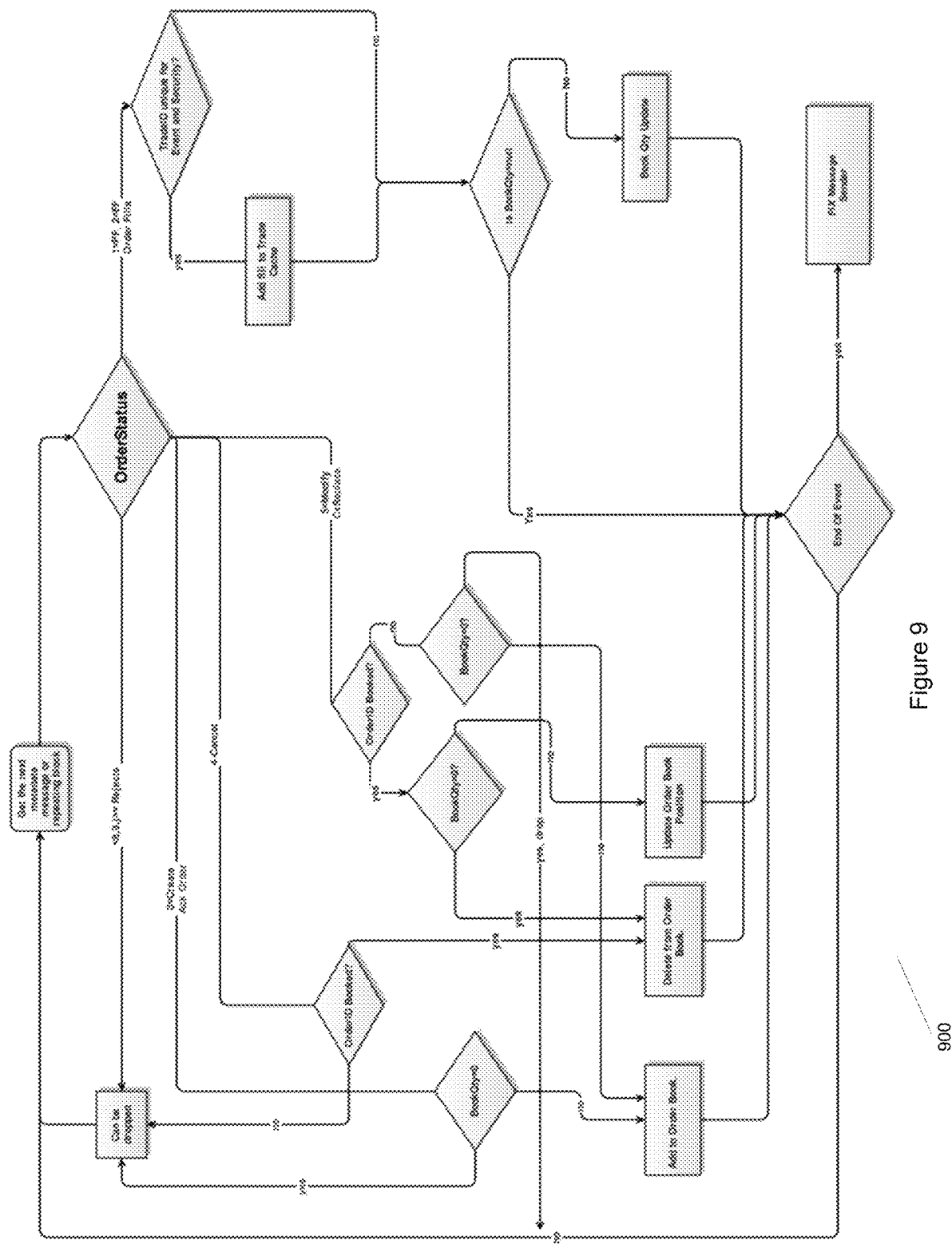
FIG. 9 and FIG. 10 are flowcharts illustrating steps performed in accordance with various aspects of the disclosure.

FIG. 9 illustrates one example of logic processing that may be performed by the market data generation (MDG) processor. The flowchart 900 in FIG. 9 shows order book management logic processing that receives an incoming message that has been transformed by inserting a minimum data set, as shown in Table 1 above. The incoming message is processed to determine order status, and then processed accordingly. For example, depending on the status indicated, an order book may be updated to reflect the update. When the EndOfEventIndicator field in the incoming message indicates the end of the event, then a message formatted, for example in FIX format, may be prepared for transmission to users and other components in the exchange.

FIG. 10 illustrates another example of logic processing that may be performed by the market data generation (MDG) processor. The flowchart 1000 in FIG. 10 shows message generation logic processing that uses the minimum data set to generate market data trade messages and trade statistics messages. The logic processing at the MDG processor may read the BookQty field and other fields in the minimum data set listed in Table 1 to confirm that the data is not duplicative and unique. The MDG processor processes the values in the fields and adds them into a data structure stored in computer memory communicatively coupled to the MDG processor. When the EndOfEventIndicator field indicates the end of the event, then a message formatted, for example in FIX format, may be prepared for transmission. The FIX formatted message may be a market data trade message. Moreover, with some additional processing, trade statistics (e.g., volume) may be calculated and formatted into a FIX message for transmission to users and other components in the exchange.

Figure 11:
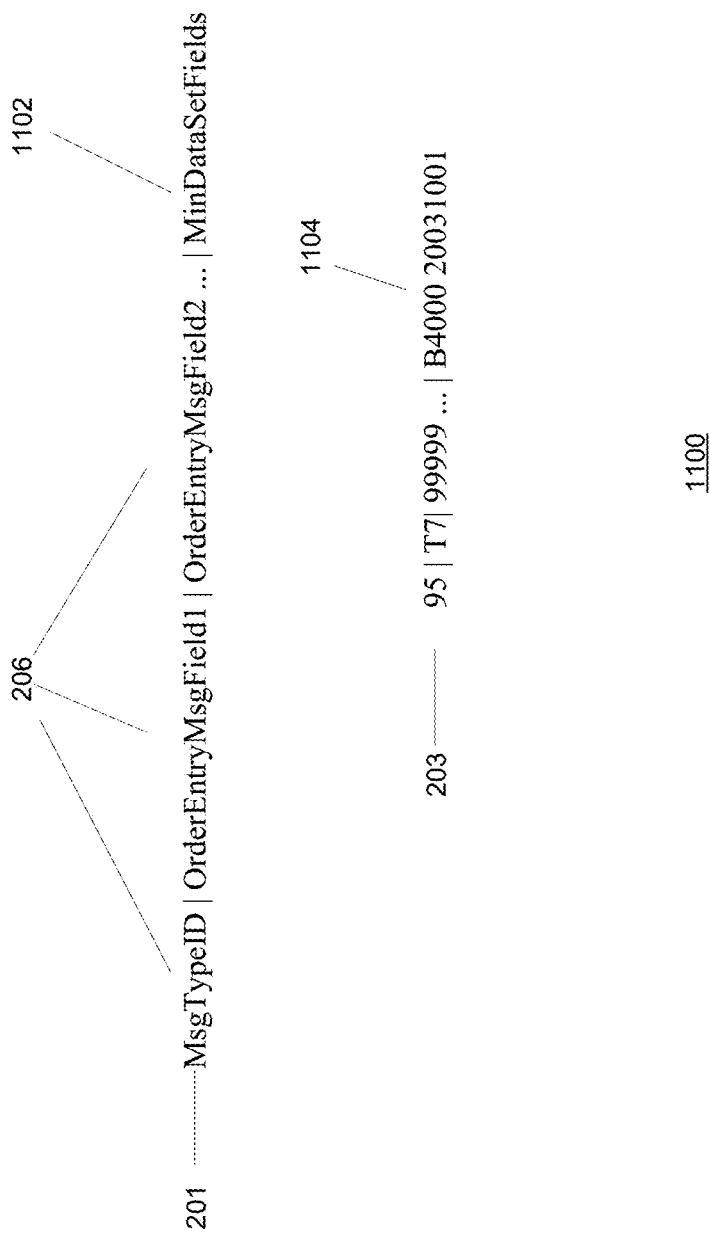
FIG. 11 is an illustrative diagram of an order entry (OE) message type transformed by an optimized match engine.

FIG. 11 describes an illustrative message structure 1100 transformed by an optimized electronic match engine. Similar to the messaging structure of FIG. 2 and its corresponding description, the message structure 1100 here may include one or more of the features of FIG. 2. For example, like FIG. 2, this message structure 1100 may support a flat message structure, as well as nest groups of repeatable data at numerous levels of nested depth. Other features of message structure 200 may also be applied to that of message structure 1100 in accordance with the spirit of the disclosure.

Although numerous examples disclosed herein refer to a market data generation (MDG) processor, the examples are not meant to be limiting. For example, in numerous examples, a plurality of MDG processors may be communicatively coupled to an optimized electronic match engine such that the load for generating the appropriate market data may be spread over the plurality of MDG processors. In other examples, the MDG processor and optimized electronic match engine may share the load of generating market data messages; for example, at peak times (e.g., when order volume is historically high), one or more MDG processors may generate a majority/all of market data messages for the exchange, but at other times, the optimized electronic match engine may assist in generating some/many/most/all of the market data messages for the exchange. A person having ordinary skill in the art after review of the entirety disclosed herein will appreciate that the disclosure contemplates the division of labor between the MDG processor and match engine being done in numerous ways.

The present disclosure has been described in terms of preferred and exemplary embodiments thereof. Numerous other embodiments, modifications and variations within the scope and spirit of the disclosure will occur to persons of ordinary skill in the art from a review of this disclosure. For example, aspects of the disclosure may be used to process and communicate data other than market data.

We claim:

1. A method of generating market data messages outside of a match engine of an exchange, comprising:

receiving, by an exchange computer system, an order entry message in a first data format;

processing the order entry message in the first data format, by the match engine, to identify matches with one or more resting orders for a match engine event;

selecting, by the match engine, a minimum data set for the match engine event, the minimum data set being derived from order attributes present at the match engine, wherein the minimum data set corresponds to a minimum number of data type fields required to fully represent market data for the match engine event;

transforming, by the match engine, the order entry message by inserting the minimum data set for the match engine event into the order entry message, wherein the minimum data set is encoded in binary format, wherein the transformed order entry message reduces computing load on the match engine;

transmitting, by the match engine, the transformed order entry message over an exchange network;

receiving, by a market data generation (MDG) processor positioned outside of the match engine, the transformed order entry message;

parsing, by the MDG processor, the transformed order entry message to extract the minimum data set for the match engine event;

updating, by the MDG processor, an order price book stored in a computer memory of the MDG processor in accordance with the extracted minimum data set; and
generating, by the MDG processor using the order price book, market data messages for consumption by participants of the exchange.

2. The method of claim 1, wherein the minimum data set consists of a book order quantity field, order status field, order priority field, order ID field, security ID field, book price field, side of order field, fill price field, last fill quantity field, trade ID field, number of orders in match field, and aggressor flag field.

3. The method of claim 1, wherein the minimum data set consists of: book order quantity field, order status field, order priority field, order ID field, security ID field, book price field, side of order field, fill price field, last fill quantity field, trade ID field, number of orders in match field, and aggressor flag field; and header-level fields of transaction time field, end of event indicator field, and number of entries field.

4. The method of claim 1, wherein the minimum data set is independent of the layout and protocol of the order entry messages received by the match engine.

5. The method of claim 1, wherein the match engine does not maintain the state of the order price book in memory of the match engine.

6. The method of claim 1, wherein the generated market data messages are formatted in a FIX format.

7. The method of claim 1, wherein the market data messages generated by the MDG processor replace those previously generated by the match engine.

8. The method of claim 1, the match engine does not generate any market data messages.

9. The method of claim 1, further comprising: receiving, by the MDG processor, state information of an order price book to reconstruct the order price book stored in the computer memory of the MDG processor.

10. The method of claim 1, wherein the order price book is arranged to generate market-by-order (MBO) market data messages.

11. The method of claim 1, wherein the order price book is arranged to generate market-by-price (MPB) market data messages.

12. The method of claim 1, wherein the orders are selected from the group consisting of securities, fixed income, interest rates, agricultural, and industrial commodities.

13. The method of claim 1, wherein the market data comprises statistics.

14. A non-transitory computer-readable medium containing computer-executable instructions that, when executed by a processor, cause an exchange computer system to perform a method comprising:
receiving an order entry message in a first data format;
processing the order entry message in the first data format, by a match engine of the exchange computer system, to identify matches with one or more resting orders for a match engine event;
selecting, by the match engine, a minimum data set for the match engine event, the minimum data set being derived from order attributes present at the match engine, wherein the minimum data set corresponds to a minimum number of data type fields required to fully represent market data for the match engine event;
transforming, by the match engine, an outgoing message by inserting the minimum data set into the outgoing message, wherein the minimum data set is encoded in binary format, wherein the transformed order entry message reduces computing load on the match engine associated with market data generation;
transmitting, by the match engine, the transformed outgoing message over an exchange network;
receiving by a market data generation (MDG) processor positioned outside of the match engine, the transformed outgoing message;
parsing, by the MDG processor of the exchange computer system, the transformed outgoing message to extract the minimum data set for the match engine event;
updating, by the MDG processor, an order price book stored in a computer memory of the MDG processor in accordance with the extracted minimum data set; and
generating, by the MDG processor using the order price book, market data messages.

15. The non-transitory computer-readable medium of claim 14, wherein the minimum data set consists of: book order quantity field, order status field, order priority field, order ID field, security ID field, book price field, side of order field, fill price field, last fill quantity field, trade ID field, number of orders in match field, and aggressor flag field; and header-level fields of transaction time field, end of event indicator field, and number of entries field.

16. The non-transitory computer-readable medium of claim 14, wherein the match engine does not maintain the state of the order price book in memory of the match engine.

17. The non-transitory computer-readable medium of claim 14, wherein the order price book is arranged to generate at least market-by-order (MBO) market data messages and market-by-price (MPB) market data messages.

18. The non-transitory computer-readable medium of claim 14, wherein the match engine does not generate market data messages.

19. A exchange computer system, comprising:
an exchange network;
an optimized match engine comprising a computer processor configured to perform a method comprising:
processing an order entry message in a first data format to identify matches with one or more resting orders for a match engine event;
selecting a minimum data set for the match engine event, the minimum data set being derived from order attributes present at the optimized match engine, wherein the minimum data set corresponds to a minimum number of data type fields required to fully represent market data for the match engine event;
transforming the order entry message by inserting the minimum data set into the order entry message, wherein the minimum data set is encoded in binary format, wherein the transformed order entry message reduces computing load on the match engine associated with market data generation;
transmitting the transformed order entry message over the exchange network; and
a market data generation (MDG) processor comprising computer memory storing computer-executable instructions that, when executed by the MDG processor, causes the MDG processor to perform a method comprising:
receiving the transformed order entry message;
parsing the transformed order entry message to extract the minimum data set for the match engine event;
updating an order price book stored in the computer memory of the MDG processor in accordance with the extracted minimum data set; and generating market data messages using the order price book;

wherein the MDG processor is positioned outside of the optimized match engine.

20. The system of claim 19, wherein the minimum data set consists of: book order quantity field, order status field, order priority field, order ID field, security ID field, book price field, side of order field, fill price field, last fill quantity field, trade ID field, number of orders in match field, and aggressor flag field; and header-level fields of transaction time field, end of event indicator field, and number of entries field.

* * * * *